(12) United States Patent
Cheng et al.

(10) Patent No.: US 7,292,353 B2
(45) Date of Patent: Nov. 6, 2007

(54) METHOD AND APPARATUS FOR MEASURING THE POSITION OF FERRULE OF A LASER MODULE

(75) Inventors: Wood-Hi Cheng, Kaohsiung (TW); Yi-Cheng Hsu, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 11/340,587

(22) Filed: Jan. 27, 2006

(65) Prior Publication Data
US 2007/0017275 A1    Jan. 25, 2007

(30) Foreign Application Priority Data
Jul. 20, 2005    (TW) ............................. 94124433 A (51) Int. Cl.
*G01B 11/14*    (2006.01)
(52) U.S. Cl. ...................... 356/614; 385/134
(58) Field of Classification Search ................. 356/614
See application file for complete search history.

(56) References Cited

OTHER PUBLICATIONS

Yi-Cheng Hsu et al., "Postweld-Shift-Induced Fiber Alignment Shifts in Laser-Welded Laser Module Packages: Experiments and Simulations," Journal of Lighwave Technology, vol. 23.
Yi-Cheng Hsu, "A Novel Fiber Alignment Shift Measurement and Correction Technique in Laser-Welded Laser Module Packaging," Journal of Lightwave Technology, vol. 23, No. 2 Feb. 2005.
Pu-Hsien Hsu et al., "High Yield Coaxial-Type Laser Module Packages Using On-Line Monitoring System," Optics and Photonics, Taiwan 2005.

*Primary Examiner*—Roy M. Punnoose
(74) *Attorney, Agent, or Firm*—Volentine & Whitt, PLLC (57) ABSTRACT

The present invention relates to a method and apparatus for measuring the position of a ferrule of a laser module. The apparatus comprises an XYZ stage, a base, a receiving portion and a laser displacement meter (LDM). The XYZ stage is used for moving in three-dimensional directions. The base has a first slot by which the base is detachably connected to the XYZ stage. The receiving portion is fixed to the base and has a second slot. The laser displacement meter is used for measuring the distance between the ferrule and the laser displacement meter. The laser displacement meter is detachably connected to the receiving portion in the second slot. Whereby, the quantitative measurement and correction to the effect of the postweld-shift (PWS) on the fiber alignment shifts in laser-welded laser module packaging is achieved. Therefore, the reliable laser modules with high yield and high performance used in low-cost lightwave transmission systems may be developed and fabricated.

7 Claims, 6 Drawing Sheets

METHOD AND APPARATUS FOR MEASURING THE POSITION OF FERRULE OF A LASER MODULE

BACKGROUND OF THE INVENTION

1. Field of the Invention

The invention relates to a method and apparatus for measuring the position of a ferrule of a laser module, particularly to a method and apparatus for measuring the position of a ferrule of a laser module for compensating the shift of the ferrule after the laser module is welded.

2. Description of the Related Art

There are many types of laser module packaging, and the co-axial type and the box type are broadly used. The greatest challenge for the co-axial type of laser module packaging is to use a reliable and accurate jointing process. During the welding process, the rapid solidification of the welded region and the associated material shrinkage often cause a postweld shift (PWS) between the welded components. For a typical single-mode-fiber application, if the PWS-induced fiber alignment shift by the laser-welding-jointing process is even only a few micrometers, up to 50% or greater loss in the couple power may occur. During the solidification, shrinkage causes many different levels of shift, and there are many factors affecting the shift, such as the input welding energy, the joint geometric design and material's conditions. Since the solidification-shrinkage-induced PWS is a non-linear behavior, it is a difficult task to analyze the PWS.

For the present laser module packaging, there is still not a quantitative measurement or a compensation principle for welded shift. In a conventional skill, it is measured by using hands to estimate the direction and level of the PWS. However, the sensitivity of the PWS for a coupled efficiency is smaller than 1 µm, and thus the measurement by using hands is not a quantitative measurement and is not accurately estimated, so that the additional welding process is inefficient, and the efficiency and yield of laser module packaging cannot be effectively improved.

Consequently, there is an existing need for a method and apparatus for measuring the position of a ferrule of a laser module.

SUMMARY OF THE INVENTION

One objective of the present invention is to provide a method and apparatus for measuring the position of a ferrule of a laser module. By utilizing the method and apparatus of the invention, the quantitative measurement and correction to the effect of the postweld-shift (PWS) on the fiber alignment shifts in laser-welded laser module packaging is achieved. Therefore, the reliable laser modules with high yield and high performance used in low-cost lightwave transmission systems may be developed and fabricated.

Another objective of the present invention is to provide a measuring apparatus for measuring the position of a ferrule of a laser module. The measuring apparatus comprises an XYZ stage, a base, a receiving portion and a laser displacement meter (LDM). The base has a first slot, and the base is connected to the XYZ stage by a first fixing device and the first slot. The first slot extends along a vertical direction. Whereby, the base can be fixed in different positions of the XYZ stage. The receiving portion is connected to the base and has a second slot. The laser displacement meter is used for measuring the distance between the ferrule and the laser displacement meter. The laser displacement meter is connected to the receiving portion by a second fixing device and the second slot. The second slot extends along a horizontal direction. Whereby, the laser displacement meter can be fixed in different positions of the receiving portion.

Still another objective of the present invention is to provide a method for measuring the position of a ferrule of a laser module. The method of the invention comprises the steps of:

(a) providing a laser module having a ferrule;
(b) measuring the distance between the ferrule and the laser displacement meter by utilizing a laser displacement meter;
(c) rotating the ferrule by a plurality of times and measuring the distance between the ferrule and the laser displacement meter of different angles respectively;
(d) changing the corresponding height between the ferrule and the laser displacement meter;
(e) measuring the distance between the ferrule and the laser displacement meter by utilizing the laser displacement meter;
(f) rotating the ferrule by a plurality of times and measuring the distance between the ferrule and the laser displacement meter of different angles respectively; and
(g) obtaining the position of the center of the ferrule according to the above measurements.

DETAILED DESCRIPTION OF THE INVENTION

Figure 1:
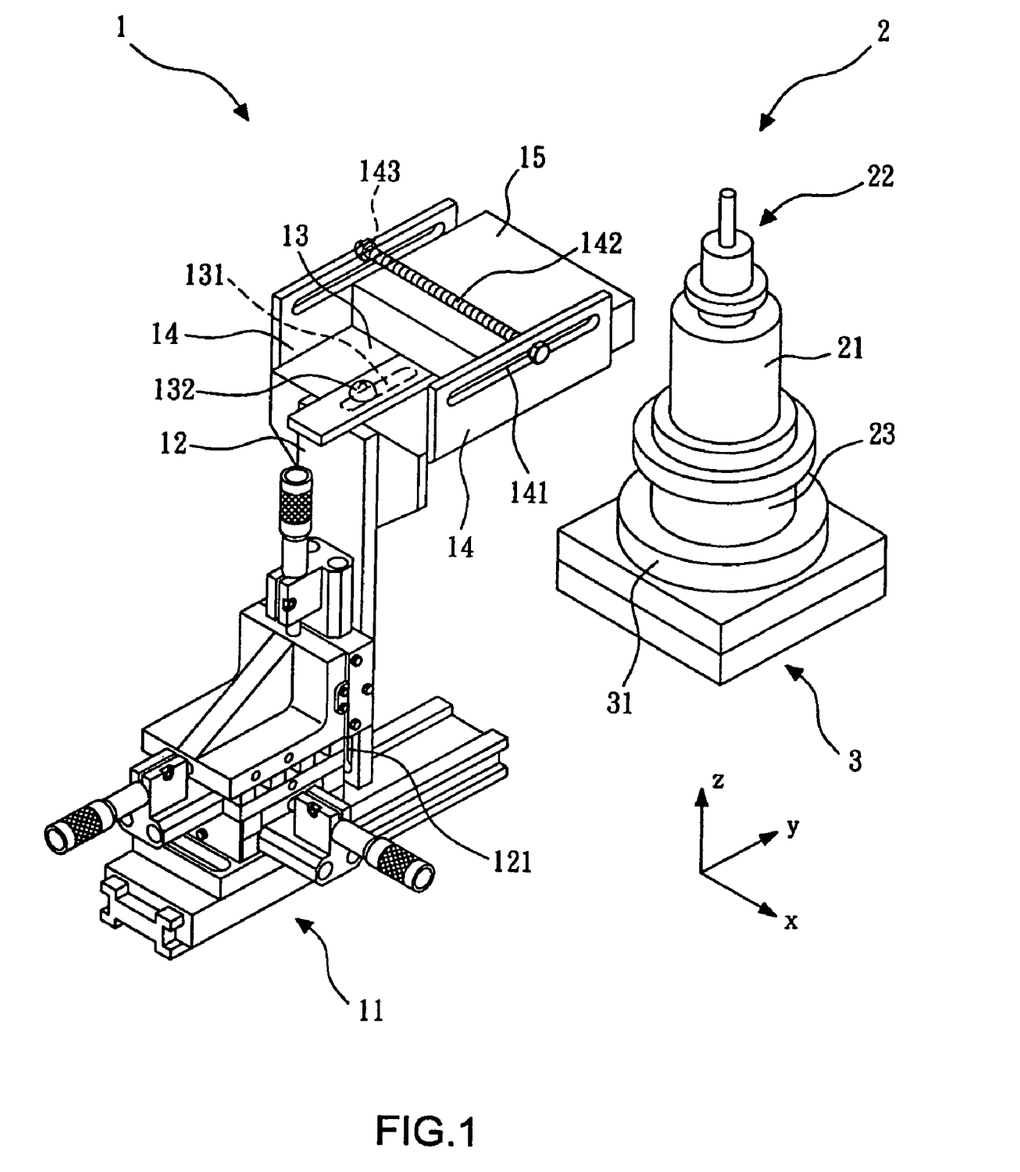
FIG. 1 shows a measuring apparatus for measuring the position of a ferrule of a laser module according to the present invention.

Referring to FIG. 1, it shows a measuring apparatus for measuring the position of a ferrule of a laser module according to the present invention. The measuring apparatus 1 of the present invention comprises an XYZ stage 11, a base 12, a receiving portion 13, two sidewalls 14 and a laser displacement meter (LDM) 15. The base 12 is connected to the XYZ stage 11, and the base 12 can move in three-dimensional directions (x-direction, y-direction and z-direction) on the XYZ stage 11.

The base 12 has a first slot 121, and the base 12 is detachably connected to the XYZ stage 11 by a first fixing device (for example a screw) (not shown in the FIG. 1) and the first slot 121. The first slot 121 extends along the vertical direction (i.e. z-direction), and the length of the first slot 121 is about 0.1 cm to 10 cm. Whereby, the base 12 can be fixed in different positions of the XYZ stage 11, i.e., the base 12 can be adjusted to a predetermined position after the first fixing device is loosened, and then the base 12 is fixed on the XYZ stage 11 by using the first fixing device through the first slot 121. Since the XYZ stage 11 can just move by a limited shift, by utilizing the first slot 121 of the base 12, the shift of the laser displacement meter 15 in the vertical direction increases. In the embodiment, the base 12 is plate-shaped and extends along the vertical direction.

The laser displacement meter 15 is used for measuring the distance between the ferrule and the laser displacement meter 15. The laser displacement meter 15 is a conventional structure. In the embodiment, the laser displacement meter 15 is product of KEYENCE Company, and its type number is LC2430. The advantage of the laser displacement meter 15 is of a resolution of 20 nm and of immediate measurement.

The receiving portion 13 is connected to the base 12 and is used to carry the laser displacement meter 15. The receiving portion 13 has a second slot 131. The second slot 131 extends along the y-direction, and the length of the second slot 131 is about 0.1 cm to 10 cm. In the embodiment, the receiving portion 13 is plate-shaped and extends along the horizontal direction (y-direction), and the receiving portion 13 is perpendicular to the base 12. The laser displacement meter 15 is detachably connected to the receiving portion 13 by a second fixing device (for example a screw 132) through the second slot 131. Whereby, the laser displacement meter 15 can be fixed in different positions of the receiving portion 13, i.e., the laser displacement meter 15 can be adjusted to a designated position after the second fixing device 132 is loosened, and then the laser displacement meter 15 is fixed on the receiving portion 13 by using the second fixing device 132 through the second slot 131. Since the XYZ stage 11 can only move by a limited shift, by utilizing the second slot 131 of the receiving portion 13, the shift of the laser displacement meter 15 in the horizontal direction (y-direction) increases.

The sidewalls 14 are located at two sides of the receiving portion 13 respectively and extend upwards. Each sidewall 14 has a third slot 141, and the sidewalls 14 extend along the y-direction by about 0.1 cm to 10 cm. In the embodiment, the sidewalls 14 are plate-shaped and are perpendicular to the receiving portion 13. A third fixing device (for example a screw 142 of which the length is longer than the distance between the third slots 141 and a nut 143) (not shown in FIG. 1) is used for enhancing the connection between the third slots 141 to prevent the laser displacement meter 15 from rotating. The width of the laser displacement meter 15 is equal to the distance between the sidewalls 14 so that the sidewalls 14 can hold the laser displacement meter 15 securely. The laser displacement meter 15 contacts with the screw 142 and is fixed by the screw 142.

Figure 2:
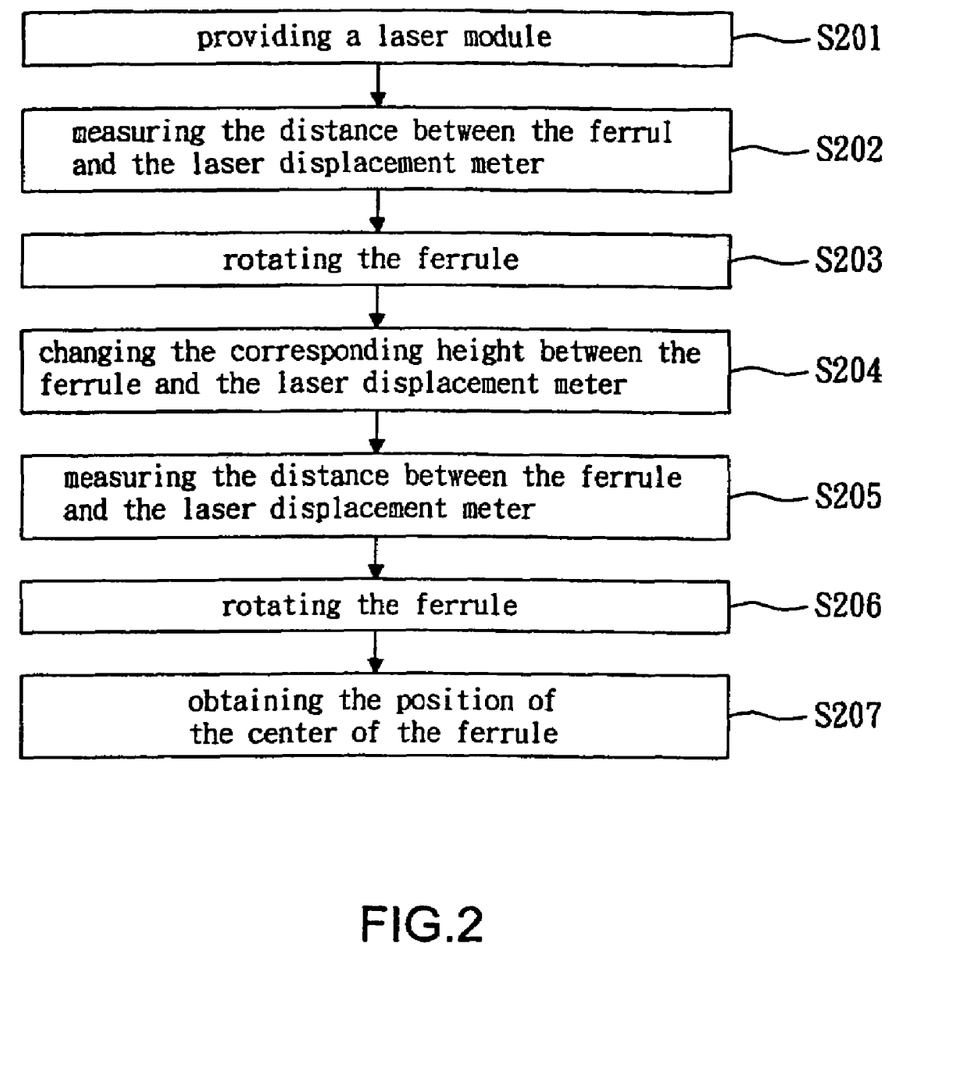
FIG. 2 shows a flowchart of the process of a method for measuring the position of a ferrule of a laser module according to the present invention.

Referring to FIG. 2, it shows a flowchart of the process of a method for measuring the position of a ferrule of a laser module according to the present invention. The operation method and measuring method of the measuring device 1 are described as follows. Referring to FIG. 1 and FIG. 2, firstly, in step S201, a laser module 2 is provided. The laser module 2 comprises a ferrule 21, a fiber 22 and a housing 23. The ferrule 21 carries the fiber 22, and the ferrule 21 is disposed on the housing 23. The housing 23 is then disposed at a clip 31 of a welding machine 3.

Figure 3:
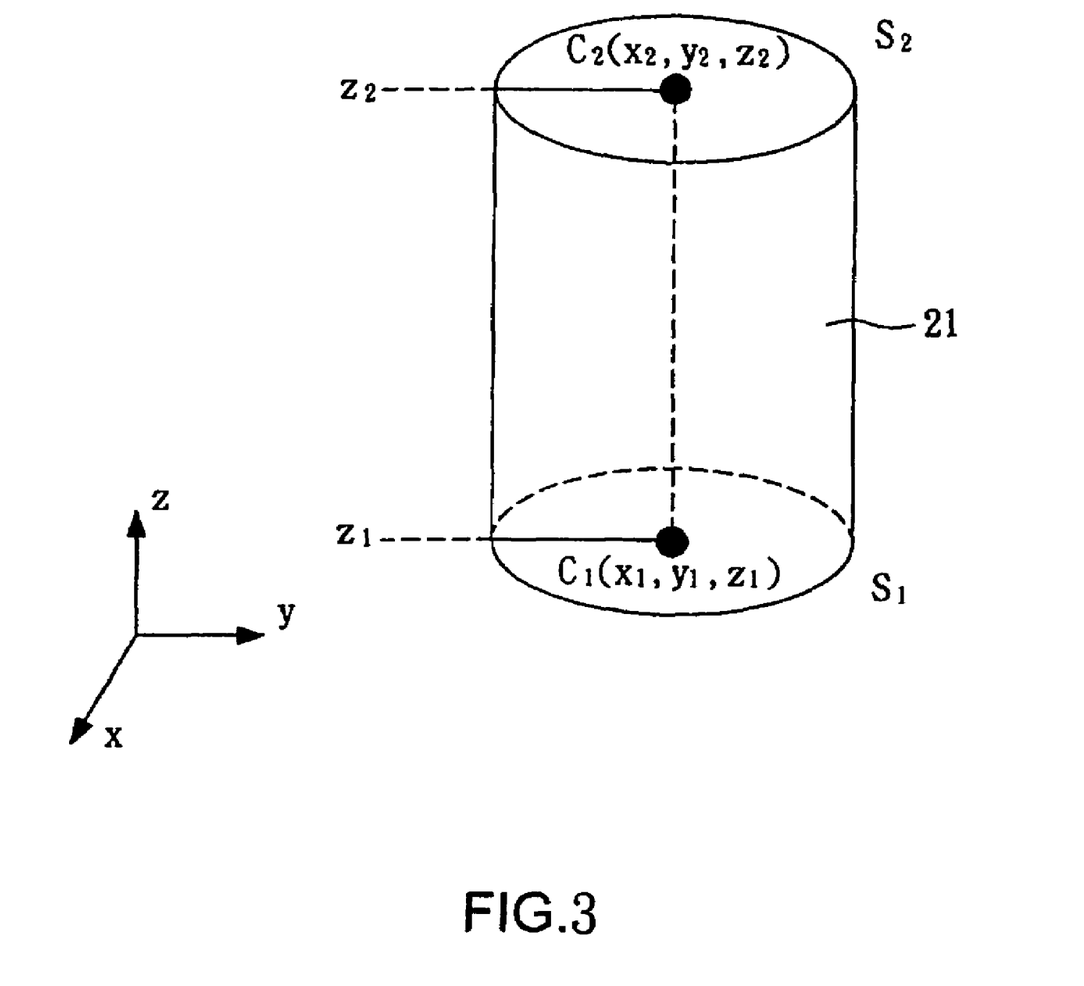
FIG. 3 shows a ferrule of the present invention.

Referring to FIG. 3, it shows the ferrule of the present invention. The principle of the present invention is described as follows. In the present invention, the position of the ferrule 21 is represented by the position vector $\overrightarrow{C_1C_2}$, wherein $C_1$ and $C_2$ are the centers of the high position $Z_1$ and the low position $Z_2$ respectively. Circles $S_1$ and $S_2$ are corresponding to $Z_1$ and $Z_2$ respectively. The circles $S_1$ and $S_2$ are obtained by rotating the welding machine 3 with an angle of 30 degrees, then by quantitatively measuring the distance between the laser displacement meter 15 and the ferrule 21, and finally by matching with curves.

Figure 4:
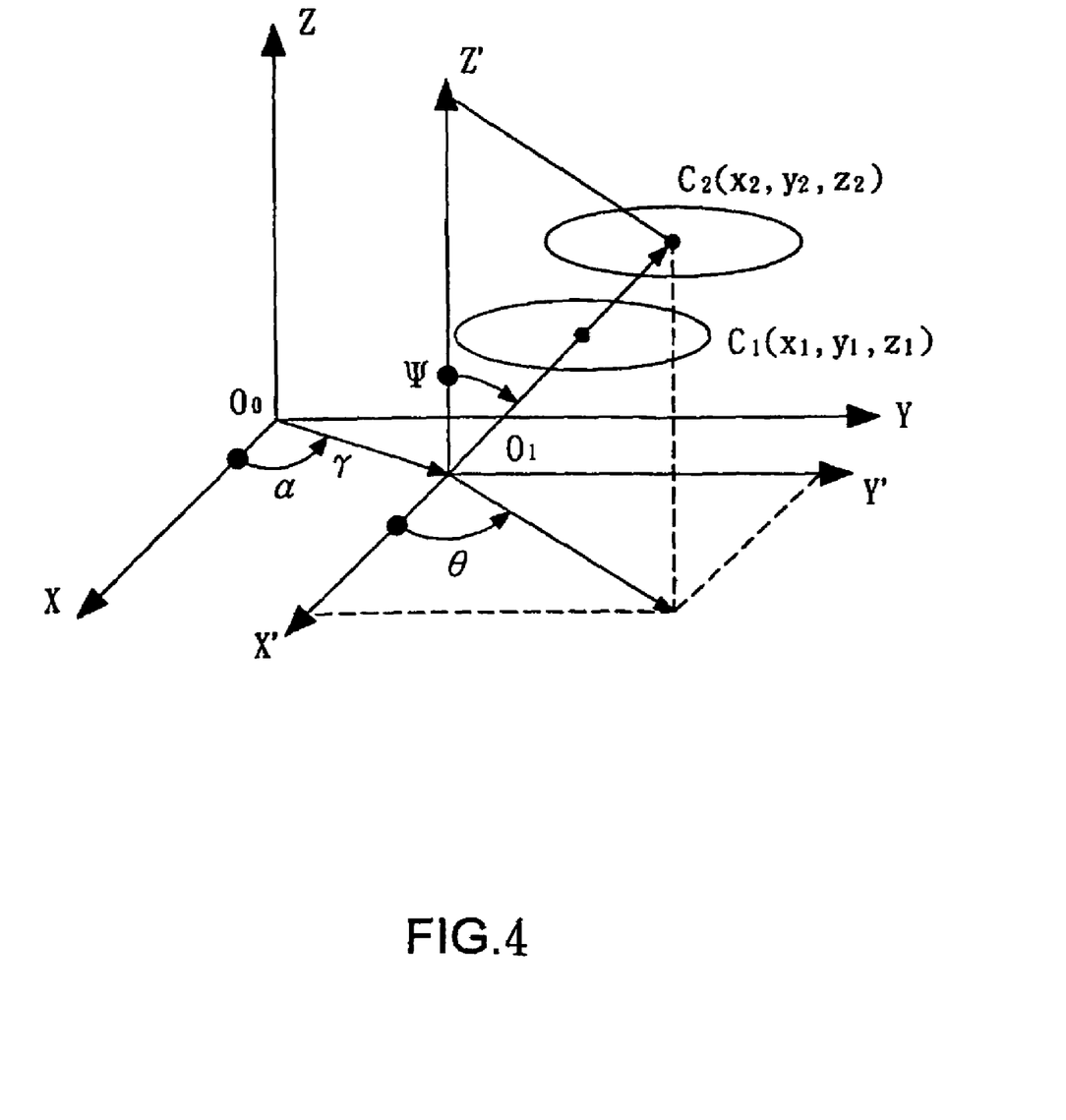
FIG. 4 shows the ferrule in three-dimensional coordinates of the present invention.

Referring to FIG. 4, it shows the ferrule in three-dimensional coordinates of the present invention. Actually, it is impossible for the origin of the position vector $\overrightarrow{C_1C_2}$ to be the same as that of the origin of the coordinates $O_0$. As shown in FIG. 4, the origin of the position vector $\overrightarrow{C_1C_2}$ moves from $O_0$ to $O_1$ on the X-Y plane. The shift of the origin is represented by the angle α between the horizontal axis r of the polar coordinates and the horizontal axis X of the coordinates. In addition, the ferrule 21 circuits round the Z'-axis with a rotating angle θ and circuits round the Y'-axis with an angle of inclination ψ. Therefore, the position vector $\overrightarrow{C_1C_2}$ of the ferrule 21 can be described as a function of the above four parameters (r, α, θ and ψ), and the shift of the ferrule 21 after welding can be calculated by the position vectors before and after welding.

Referring to FIG. 1 and FIG. 2 again, according to the above principle, after the housing 23 is mounted on the clip 31, the laser displacement meter 15 is roughly adjusted to a suitable position by utilizing the first slot 121 and the first fixing device to cooperate with adjusting the vertical height of the base 12. The detecting light spot of the laser displacement meter 15 focuses on 1500 μm high above the bottom of the ferrule 21, and the position is defined as the low position $Z_1$. Referring to step S202, the distance between the ferrule 21 and the laser displacement meter 15 is measured, and at the same time, the XYZ stage 11 must be finely tuned to make the distance between the laser displacement meter 15 and the ferrule 21 closest, and the distance is recorded.

Referring to step S203, the clip 31 of the welding machine 3 is used to rotate the ferrule 21, and the distance between the ferrule 21 and the laser displacement meter 15 of different angles are measured respectively and are recorded. The distances and the angles corresponding to the distances can be used to calculate the center $C_1$ of the ferrule 21 at the low position $Z_1$. In the embodiment, the closest distance between the ferrule 21 and the laser displacement meter 15 is measured every 30 degrees.

Referring to step S204, the corresponding height between the ferrule 21 and the laser displacement meter 15 is changed, and this can be achieved by vertically moving the ferrule 21, the laser displacement meter 15 or both of the ferrule 21 and the laser displacement meter 15. In the embodiment, the laser displacement meter 15 is moved upwards to make the detecting light spot of the laser displacement meter 15 focus on 3000 μm high above the bottom of the ferrule 21, and the position is defined as the high position $Z_2$. Referring to step S205, the distance between the ferrule 21 and the laser displacement meter 15 is measured, and at the same time, the XYZ stage 11 must be finely tuned to make the distance between the laser displacement meter 15 and the ferrule 21 closest, and the distance is recorded.

Referring to step S206, the clip 31 of the welding machine 3 is used to rotate the ferrule 21, and the closest distance between the ferrule 21 and the laser displacement meter 15 of different angles are measured respectively and are recorded. The distances and the angles corresponding to the distances can calculate the center $C_2$ of the ferrule 21 at the high position $Z_2$. In the embodiment, the closest distance between the ferrule 21 and the laser displacement meter 15 is measured every 30 degrees.

Finally, referring to step S207, by utilizing the above measurements, the four parameters (r, α, θ and ψ) for describing the center of the ferrule 21 can be calculated. Since the center of the fiber 22 is the same as the center of the ferrule 21, the center of the fiber 22 is calculated.

Figure 5:
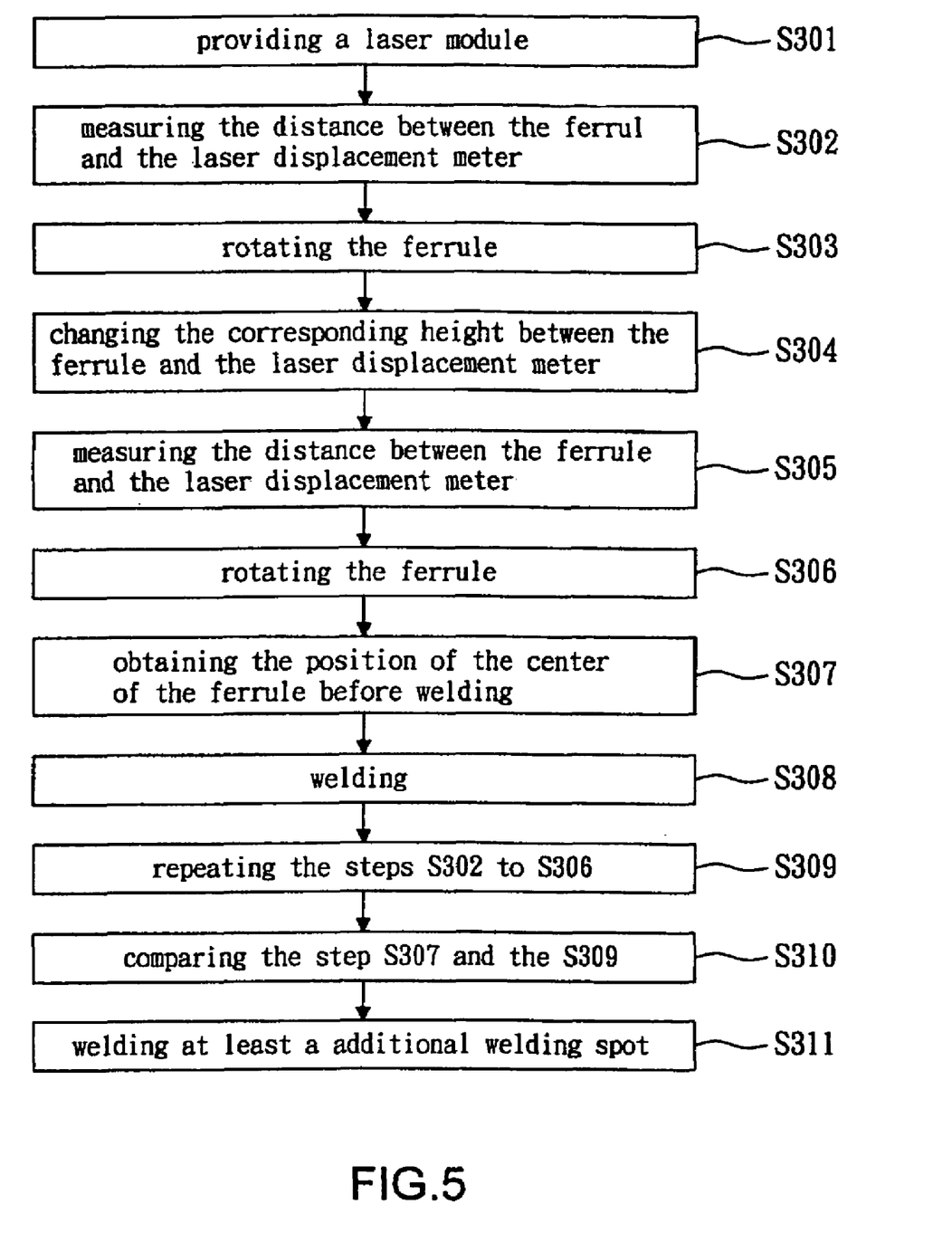
FIG. 5 shows a flowchart of the process of compensating the shift of the ferrule after the laser module is welded according to the present invention.
Figure 6:
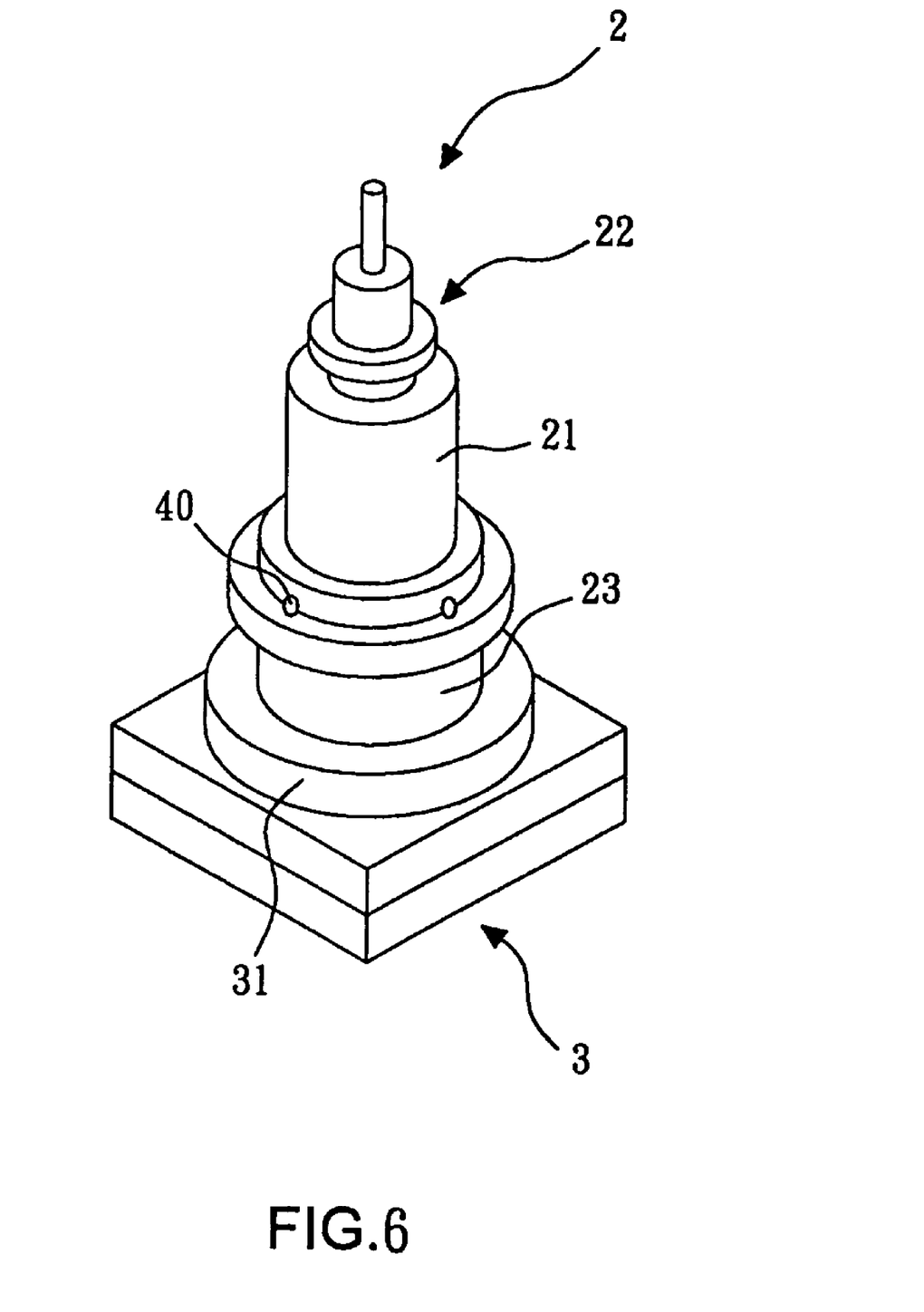
FIG. 6 shows the ferrule after welding of the present invention.

Referring to FIG. 5, it shows a flowchart of the process of compensating the shift of the ferrule after the laser module is welded according to the present invention. The steps S301 to S307 of the compensating method are the above steps S201 to 207, and the compensation method is used to calculate the center of the ferrule 21 before welding. The step S308 shows the welding steps. The bottom surface of the ferrule is welded on the top surface of the housing by a plurality of welding spots 40 by utilizing the laser beam providing by the laser welding machine 3, as shown in FIG. 6. Generally, the number of the welding spots 40 is three.

The step S309 repeats steps S302 to S306 to calculate the center of the ferrule 21 after welding. Referring to step S310, the level and direction of the shift of the center of the ferrule 21 is calculated by comparing the center of the ferrule before welding in step S307 and the center of the ferrule after welding in step S309.

Finally, referring to step S311, an additional welding spot is welded for compensating the shift according to the level and direction of the shift. In the embodiment, the additional welding spot is welded in the direction against the lateral of the ferrule 21, so that the ferrule 21 has a after-welding shift with a direction against the direction of the antecedent after-welding shift. Those shifts in opposite directions countervail each other so that the final shift becomes smaller.

Referring to list 1, it shows the measurements of the four parameters (r, α, θ and ψ) by using the compensation method. There are eight modules in the list 1, wherein the second column is for the before-welding position of the ferrule 21; the third column is for the after-welding (not compensated) position of the ferrule 21; and the fourth column is for the after-compensating position of the ferrule 21. The level and direction of the after-welding can be calculated by comparing the second column and the third column. By comparing the second column and the fourth column, the after-compensating position of the ferrule 21 is closer to the original position (the second column) than the uncompensated (the third column) position of the ferrule 21, i.e., welding an additional welding spot effectively reduces the after-welding shift and reduces the power loss.

While the embodiments have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

List 2: Power before welding, after welding and after compensating

| Module number | Coupled power before welding (μW) | Coupled power after welding (μW) | Coupled power after compensating (μW) |
|---|---|---|---|
| 1 | 524 | 416 | 467 |
| 2 | 741 | 506 | 597 |
| 3 | 892 | 759 | 798 |
| 4 | 912 | 864 | 880 |
| 5 | 934 | 856 | 875 |
| 6 | 1026 | 730 | 802 |
| 7 | 1103 | 796 | 897 |
| 8 | 1198 | 812 | 1002 |

What is claimed is:

1. A measuring apparatus for measuring the position of a ferrule of a laser module comprising:
   an XYZ stage, for moving in three-dimensional directions;
   a base, having a first slot, the base connected to the XYZ stage by a first fixing device and the first slot, the first slot extending along a vertical direction, and the base fixed in different positions of the XYZ stage;
   a receiving portion, connected to the base and having a second slot; and
   a laser displacement meter, for measuring the distance between the ferrule and the laser displacement meter, and connected to the receiving portion by a second fixing device and the second slot, the second slot extending along a horizontal direction, and the laser displacement meter fixed in different positions of the receiving portion.

2. The measuring apparatus according to claim 1, wherein the base is plate-shaped and extends along the vertical direction.

3. The measuring apparatus according to claim 1, wherein the receiving portion is plate-shaped and extends along the horizontal direction.

4. The measuring apparatus according to claim 1, wherein the receiving portion is perpendicular to the base.

5. The measuring apparatus according to claim 1, further comprising two sidewalls located at two sides of the receiving portion respectively, each sidewall having a third slot, and a third fixing device used for enhancing the connection between the third slots.

List 1: Measurements of the four parameters (r, α, θ and ψ) before welding, after welding and after compensating

| Module number | Before welding (μW) | | | | After welding (μW) | | | | After compensating (μW) | | | |
|---|---|---|---|---|---|---|---|---|---|---|---|---|
| | r(μm) | α(°) | ψ(°) | θ(°) | r(μm) | α(°) | ψ(°) | θ(°) | r(μm) | α(°) | ψ(°) | θ(°) |
| 1 | 2.93 | 81.78 | 0.12 | −34.11 | 3.82 | 59.67 | −0.84 | −29.91 | 3.37 | 66.73 | −0.54 | 34.25 |
| 2 | 2.96 | 13.01 | 0.23 | 3.64 | 4.20 | −7.18 | 0.10 | −1.20 | 3.58 | −15.22 | 0.13 | 5.17 |
| 3 | 1.90 | −55.66 | 0.01 | 19.21 | 2.12 | −74.30 | 0.08 | 30.16 | 2.01 | −64.93 | 0.02 | 24.73 |
| 4 | 3.28 | 209.35 | 0.06 | 7.23 | 3.38 | 192.16 | 0.02 | 2.79 | 3.33 | 181.77 | 0.09 | −1.36 |
| 5 | 2.15 | 36.42 | 0.07 | 193.56 | 2.23 | 13.46 | 0.04 | 188.17 | 2.19 | 21.83 | −0.01 | 176.94 |
| 6 | 2.09 | 355.94 | −0.14 | 17.54 | 2.51 | 345.53 | −0.02 | 15.22 | 2.30 | 337.29 | 0.06 | 20.64 |
| 7 | 1.54 | 310.72 | 0.07 | −56.32 | 1.98 | 288.23 | −0.17 | −69.13 | 1.76 | 274.15 | 0.11 | 74.36 |
| 8 | 3.55 | 77.69 | −0.13 | −6.47 | 5.08 | 50.50 | −0.06 | −3.57 | 4.31 | 59.23 | 0.16 | −7.82 |

6. A method for measuring the position of a ferrule of a laser module, comprising the steps of:
(a) providing a laser module having a ferrule;
(b) measuring the distance between the ferrule and the laser displacement meter by utilizing a laser displacement meter;
(c) rotating the ferrule by a plurality of times and measuring the distance between the ferrule and the laser displacement meter of different angles respectively;
(d) changing the corresponding height between the ferrule and the laser displacement meter;
(e) measuring the distance between the ferrule and the laser displacement meter by utilizing the laser displacement meter;
(f) rotating the ferrule by a plurality of times and measuring the distance between the ferrule and the laser displacement meter of different angles respectively; and
(g) calculating the position of the center of the ferrule according to the above measurements.

7. A method for compensating the shift of a ferrule after welding, comprising the steps of:
(a) providing a laser module having a housing and a ferrule;
(b) measuring the distance between the ferrule and the laser displacement meter by utilizing a laser displacement meter;
(c) rotating the ferrule by a plurality of times and measuring the distance between the ferrule and the laser displacement meter of different angles respectively;
(d) changing the corresponding height between the ferrule and the laser displacement meter;
(e) measuring the distance between the ferrule and the laser displacement meter by utilizing the laser displacement meter;
(f) rotating the ferrule by a plurality of times and measuring the distance between the ferrule and the laser displacement meter of different angles respectively;
(g) obtaining the position of the center of the ferrule according to the above measurements before welding;
(h) welding the ferrule on the housing by a plurality of welding spots;
(i) obtaining the position of the center of the ferrule after welding by repeating steps (b) to (f);
(j) obtaining the shift of the center of the ferrule by comparing the center of the ferrule before welding in step (g) and the center of the ferrule after welding in step (i); and
(k) compensating the shift by welding at least an additional welding spot.

* * * * *